United States Patent Office
3,584,056
Patented June 8, 1971

3,584,056
PROCESS FOR PREPARING ALKALI METAL ALKYL THIOMETHYL MERCAPTANS BY REACTION OF ALKYLTHIOMETHYLMETAL COMPOUNDS AND SULFUR
Donald J. Peterson, Cincinnati, Ohio, assignor to The Procter & Gamble Company, Cincinnati, Ohio
No Drawing. Original application Mar. 13, 1967, Ser. No. 622,419, now Patent No. 3,502,731, dated Mar. 24, 1970. Divided and this application Jan. 19, 1970, Ser. No. 4,030
Int. Cl. C07c 149/06, 149/17, 149/24
U.S. Cl. 260—609
2 Claims

ABSTRACT OF THE DISCLOSURE (1) Alkylthiomethylmetal compounds prepared by reacting alkyl methyl sulfides with potent metalating agents, e.g., a complex between alkyllithium compounds and alkylenediamines; alkyl- or phenylsodium; or alkyl- or phenylpotassium; (2) the reactions of the alkylthiomethylmetal compounds with organic halides, epoxides, aldehydes, trialkyl- and triarylphosphites, mono- and dihalo and trihalo and pseudohaloalkyl- and arylphosphines, mono-, di-, and trihalo and pseudohaloalkyl- and arylsilanes, carbon dioxide, and sulfur; and (3) new compounds produced thereby containing phosphorous and sulfur or silicon and sulfur.

CROSS-REFERENCES TO RELATED APPLICATIONS

This application is a division of U.S. patent application Ser. No. 622,419, filed Mar. 13, 1967, now U.S. Pat. No. 3,502,731 entitled Alkylthiomethylmetal Compounds, Preparation Thereof, and Reactions Thereof, in the name of Donald J. Peterson.

BACKGROUND OF THE INVENTION

This invention relates in part to alkyl methyl sulfide derivatives. Specifically this invention relates to alkylthiomethylmetal compounds useful in the synthesis of carbon substituted organosulfur compounds. This invention also relates to methods of preparing alkyl thiomethylmetal compounds, processes utilizing said compounds, and new compounds produced by said processes.

The sulfide group, or thioether linkage, is a very useful group to have in a compound. For example, the sulfide group can be readily oxidized to form the more hydrophilic sulfoxide group and/or a sulfone group and can be reacted with e.g., an alkyl halide or pseudo halide to form the corresponding sulfonium salts.

In U.S. Pat. 3,228,860, it was disclosed that a sulfoxide group would activate a hydrogen atom attached to an adjacent carbon atom sufficiently to permit the metalation of said carbon atom. Also, Corey and Seebach, J. Org. Chem., 31 4097 (1966) and Gilman and Webb J. Am. Chem. Soc., 62, 987 (1940) have reported the preparation of phenylthiomethyllithium. However, until the present invention, it had not been shown that one could metalate a carbon atom when the only activating group present in the compound to be metallated with an alkylthio group.

SUMMARY

This invention relates primarily to the discovery that it is possible to prepare alkylthiomethylmetal compounds by reacting an alkyl methyl sulfide compound having the formula:

$$RSCH_3$$

wherein R is a saturated alkyl group containing from 1 to 30 carbon atoms, from 0 to 10 substituent oxygen atoms replacing methylene groups in alkyl and alkylene groups, and from 0 to 2 substituents selected from the group consisting of aryl groups, alkaryl groups, and tertiary amino groups, said substituents being placed so that no aryl moiety, oxygen atom, or nitrogen atom is attached to any carbon atom which is less than three atoms removed from the sulfur atom with a metalating agent selected from the group consisting of (1) phenylsodium (2) phenylpotassium (3) alkylsodium wherein the alkyl group contains from 1 to 20 carbon atoms and is attached to the sodium through a primary carbon atom, (4) alkylpotassium wherein the alkyl group contains from 1 to 20 carbon atoms and is attached to the potassium through a primary carbon atom, and (5) a complex of an alkyllithium wherein said alkyl group contains from 1 to about 20 carbon atoms with an amino compound selected from the group consisting of compounds having the formula $$(R^1)_2NR^2N(R^1)_2$$

wherein each $R^1$ group is a saturated alkyl group containing from 1 to about 20 carbon atoms and wherein $R^2$ is a saturated alkylene group containing from 1 to 5 carbon atoms and wherein the total number of carbon atoms in said amino compound is from 5 to about 28 carbon atoms and diazabicyclo(2.2.2)octane said reaction taking place in an inert atmosphere at a temperature of from about −60° C. to about 100° C. and in a solvent which is either an excess of the alkyl methyl sulfide or a saturated hydrocarbon containing from about 5 to about 12 carbon atoms.

The alkyl methyl sulfide compounds which react with the potent metalating agents to form the alkylthiomethylmetal compound are characterized by the absence of any substituent aryl group, oxygen atom or nitrogen atom on either of the two carbon atoms nearest the sulfur atom in the alkyl group. It has been found, surprisingly, that a hydrogen atom in the methyl group of such a compound is sufficiently activated so that the potent metalating agents hereinbefore described can remove said hydrogen atom to form the novel alkylthiomethylmetal compounds of this invention:

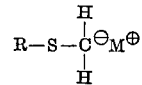

wherein M is an alkali metal, e.g., sodium, potassium, or lithium.

THE ALKYL METHYL SULFIDE

Suitable R groups include both unsubstituted saturated alkyl hydrocarbon groups and substituted alkyl groups containing, for example, oxygen substituents replacing methylene groups and substituent tertiary amino groups. Preferably, the R group in the formulas above and below is an alkyl group (straight, cyclic, or branched) containing from 1 to about 20 carbon atoms (e.g., methyl, ethyl, n-propyl, isopropyl, n-pentyl, isopentyl, n-hexyl, 2,2-dimethylpentyl, n-heptyl, n-octyl, 2,2 - dimethylhexyl, isooctyl, 2 - ethylhexyl, n-nonyl, n-decyl, tripropylene, undecyl, n-dodecyl, tetrapropylene, tridecyl, n-tetradecyl, pentadecyl, n-hexadecyl, n-octadecyl, eicosyl, cyclopentyl, cyclohexyl, cyclohexylmethyl, methylcyclohexyl, 2-cyclohexyldodecyl, 12-cyclohexyldodecyl, 4-dodecylcyclohexyl, and cyclooctyl groups. The preferred alkyl group is methyl and the preferred alkyl methyl sulfide is dimethyl sulfide.

Examples of other saturated hydrocarbon groups include groups containing up to two substituent aryl groups, e.g., phenyl, biphenyl, or naphthyl groups and branched or straight alkyl and/or alkylene groups of from 1 to about 14 carbon atoms, e.g., 3-phenyl-dodecyl, 4-methyl, 4-phenyloctyl, 4-phenyltetradecyl, 3-(1-naphthylbutyl), 4-(1-naphthylbutyl), 3-(4-biphenyl)pentyl, and 3-(4-biphenyl)propyl groups.

The presence of certain relatively non-reactive groups, as hereinbefore described, in or on the R groups is permissible. As an example of relatively non-reactive substituents, the R group can contain up to about 10 oxygen atoms replacing methylene groups in alkyl or alkylene groups or up to two tertiary amino groups. Thus R can represent, for example, such groups as 4,7,10-trioxaeicosyl, 3- dodecoxypropyl, 3-octadecoxypropyl, 3-methoxypropyl, 4-ethoxybutyl, 6-hexoxyhexyl, 3-octoxyheptyl, 11-methoxyundecyl, 11 - ethoxyundecyl, 9 - methoxyoctadecyl, 10-ethoxyoctadecyl, 3-methoxycyclohexyl, 3-cyclohexyloxydecyl, 4,7 - dioxaheptadecyl, 3 - dimethylaminopropyl, 3,6-di(diethylamino)-hexyl, and 3-diethylaminopropyl groups.

(R groups, once defined, have the same definitions throughout the specification and claims.)

The preferred alkyl methyl sulfide starting compound is dimethyl sulfide because it undergoes the aforesaid reaction with remarkable facility and dimethyl sulfide is readily available.

Other preferred alkyl methyl sulfide starting compounds are alkyl methyl sulfides wherein the alkyl groups contain from 2 to about 20 carbon atoms (e.g., dodecyl methyl sulfide). For maximum yield of the alkylthiomethylmetal compounds when these long chain alkyl sulfides are used, it is desired that there be no hydrogen atom attached to the β-carbon atom on the long alkyl group. When there is a β-hydrogen atom on the long alkyl group an elimination reaction occurs giving an α-olefin as a by-product and consequently less alkylthiomethylmetal compound is formed.

There will normally be a stoichiometric amount, or an excess, of the alkyl methyl sulfide starting material relative to the metalating agent to prevent the excess metalating agent from interfering with subsequent reactions of the alkylthiomethylmetal compounds.

METALATING AGENTS

Suitable alkyllithiums for use in the metalating complex and alkylsodiums and alkylpotassiums for use by themselves include those wherein the alkyl groups are methyl, ethyl, propyl, butyl, allyl, 3-dodecenyl, 8-tetradecenyl, pentyl, octyl, decyl, tetrapropylene, hexadecyl, dodecyl, octadecyl, or eicosyl groups. The unsaturated alkyl groups suitable for use in the metalating agents and in all of the reactants described hereinafter should not contain any "terminal unsaturation," i.e., the metal should not be bonded to any of the carbon atoms which comprise the center of unsaturation.

The alkyllithiums are preferably selected so that the point of attachment of the lithium is not a tertiary carbon atom since these tertiary alkyllithiums, e.g., t-butyllithium, are not readily activated by complexation with all diamines. For example, t-butyllithium will complex with diazabicyclo(2.2.2.)octane. The alkylsodiums and alkylpotassiums are those that have the metal atom attached to a primary carbon atom, since the corresponding 2° and 3° organometallic compounds are difficult or impossible to prepare.

Suitable $R^1$ groups in the diamine compound of the metalating agent include methyl, ethyl, n-propyl, isopropyl, n-pentyl, isopentyl, n-hexyl, 2,2-dimethylpentyl, n-heptyl, n-octyl, 2,2-dimethylhexyl, isooctyl, 2-ethylhexyl, 2,4-hexadienyl, 2,4-dodecadienyl, 2,7-tetradecadienyl, 2,4, 6,-dodecatrienyl, allyl, 3-dodecenyl, 8-tetradecenyl, n-nonyl, n-decyl, tripropylene, undecyl, n-dodecyl, tetrapropylene, tridecyl, n-tetradecyl, pentadecyl, n-hexadecyl, n-octadecyl, eicosyl, cyclopentyl, cyclohexyl, cyclohexylmethyl, methylcyclohexyl, 2-cyclohexyldodecyl, 12-cyclohexyldodecyl, 4-dodecylcyclohexyl, and cyclooctyl groups. The preferred $R^1$ groups are methyl and ethyl groups.

Suitable $R^2$ groups include methylene, ethylene, propylene, butylene, and pentylene groups. The preferred $R^2$ group is an ethylene group and other preferred $R^2$ groups are methylene and propylene groups. Diamines with these $R^2$ groups are very effective complexing agents.

Examples of suitable diamine complexing agents include N-methyl, N-ethyl, N'-propyl, N'-butylpropylenediamine, N-dodecyl, N,N',N'-trimethylmethylenediamine, N - octyl, N,N',N' - triethylbutylenediamine, N,N',N'-tetraethylpropylenediamine, and N-eicosyl, N,N',N'-trimethylethylenediamine.

The preferred diamine complexing agents are N,N,N', N'-tetramethylethylenediamine and N,N,N',N'-tetraethylethylenediamine.

The ratio of the alkyllithiums to the diamine complexing agents is normally 1:1.

The metalation reaction and other subsequent reactions must take place in an inert atmosphere of, e.g., nitrogen, argon or helium, since the organometallic compounds are so reactive that they will be destroyed if exposed to a reactive atmosphere.

The temperature of the reaction can be any temperature at which the reaction mixture is liquid, e.g., any temperature above about −60° C. The preferred temperature is room temperature, e.g., (about 20° C.) preferably; the temperature is less than about 100° C. since the organometallic compounds tend to decompose above this temperature.

Although an excess of the short chain alkyl methyl sulfides can be used as a solvent, the metalating agents normally are sold commercially with an excess of liquid saturated hydrocarbons as a solvent and it is undesirable to remove this solvent so saturated hydrocarbons are conveniently used as a solvent. Suitable liquid saturated hydrocarbons which can be used as solvents include pentane, hexane, octane, isooctane, nonane, decane, isododecane, cyclohexane, etc. Saturated hydrocarbons containing from five to eight carbon atoms are preferred since they are easily removed by distillation. Liquid saturated hydrocarbons are used since they will not undergo reaction with the organometallic compounds.

REACTIONS OF ALKYLTHIOMETHYLMETAL COMPOUNDS

Reaction with organic halides

The alkylthiomethylmetal compounds of this invention will react with organic halides having the Formula $R^3X$ wherein $R^3$ is a saturated or unsaturated alkyl group containing 1 to 30 carbon atoms, from 0 to 10 oxygen atoms substituted for methylene groups in alkyl and alkylene groups, from 0 to 5 tertiary amino group substituents, and from 0 to 2 substituents selected from the group consisting of aryl and alkaryl groups, there being no terminal unsaturation (i.e., vinylic halides) in said alkyl groups, and wherein X is a halogen atom selected from the group consisting of chlorine, bromine, and iodine.

The alkylation reaction proceeds as follows:

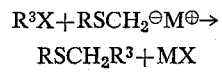

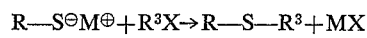

(Since the formation of the alkylthiomethylmetal compounds is accompanied by the formation of alkali metal alkyl mercaptides due to displacement and/or elimination reactions there is also an alkylation reaction as follows when the alkyl thiomethylmetal compounds are used:

$$R-S^\ominus M^\oplus + R^3X \rightarrow R-S-R^3 + MX$$

Accordingly, the alkylation reaction will normally produce a mixture of dialkyl sulfides.)

Preferred alkyl halides are those wherein the alkyl or alkenyl group contains from 1 to 20 carbon atoms. Hydrocarbon groups are preferred. Suitable alkyl groups ($R^3$) are: methyl, ethyl, propyl, 2,4-hexadienyl, 2,4-dodecadienyl, 2,7-tetradecadienyl, 2,4,6-dodecatrienyl, allyl, 3-dodecenyl, 8-tetradecenyl, 2-dodecynyl, 2,4-hexadiynyl, 2,4-dodecadiynyl, butyl, butenyl, propargly, pentyl, hexyl, octyl, decyl, undecyl, dodecyl, tetrapropylene, tetradecyl, pentadecyl, hexadecyl, octadecyl, and eicosyl groups. Suitable substituted alkyl chains include: 4,7,10,13-tetraoxaeicosyl; 3-phenylbutyl, 4-phenylbutyl; 4-(2-naphthyl)butyl; 3-(1-naphthylpentyl); 3-(4-biphenyl)propyl; 3-(4-biphenyl)butyl; 3-(dimethylamino)propyl; 3,6-di(diethylamino)hexyl; and 3-dodecoxypropyl groups. Substituted alkyl groups wherein only aryl and alkaryl hydrocarbon groups are present are preferred.

Preferably, the resulting dialkyl- and substituted dialkylsulfides contain from 3 to about 30 carbon atoms.

The alkylation reactions must be carried out in an inert atmosphere and at a temperature of from about —60° C. to about 100° C. The conditions for this reaction are essentially the same as for the metalation reaction described hereinbefore. However, it is permissible to utilize more reactive solvents in this reaction. For example, one can also use ethers containing from four to 14 carbon atoms such as diethyl ether, dibutyl ether, diphenyl ether, tetrahydrofuran, 1,2-dimethoxyethane and diethylene glycol dimethyl ether.

(Except where specifically stated, all of the reactions of the alkylthiomethylmetal compounds of this invention, discussed hereinafter more fully, will take place under the same conditions as this alkylation reaction with organic halides.)

The products of these alkylation reactions are dialkyl- and substituted dialkylsulfides. These sulfides are, for the most part, known compounds. (See, e.g., Organic Chemistry of Bivalent Sulfur, E. Emmet Reid, vol. II, Chemical Publishing Co. Inc. (1960, especially pp. 78–79.) The sulfides can, of course, be oxidized to the corresponding sulfoxides and sulfones which are also known compounds and which have known utilities. (See, e.g., U.S. Pats. 2,199,989; 2,515,120; 2,702,824; 2,787,595; 2,925,442; 3,006,963; 3,231,334; and 3,045,051.) For example, when the sulfoxides contain less than about 8 carbon atoms they are excellent solvents for, e.g., interesterification reactions (see U.S. Pats. 2,812,324; 2,997,490; and 3,023,183); (see also U.S. Pats. 3,264,362; 3,280,177; 3,203,827 and 3,256,340 and Organic Sulfur Compounds, N. Kharasch, chapters 16 and 17, vol. I, Pergamon Press (1961), for other reactions utilizing sulfoxides as solvents); when the sulfoxides contain one long alkyl chain of from 8 to about 20 carbon atoms they are detergents, see, e.g., U.S. Pat. 2,787,595; sulfoxides and sulfones containing two long alkyl chains are fabric softeners for, e.g., cotton when applied in a padding bath at a level of about 1% by weight of the cloth.

The dialkyl- and substituted dialkyl sulfide products of these alkylation reactions can also be converted into the corresponding sulfonium salts by reacting said sulfide products with either a substituted or unsubstituted alkyl, or aralkyl halide or pseudo halide (e.g., methylsulfate). The corresponding sulfonium compounds are also known. (See, e.g., Reid op. cit. supra. pp. 66–75, 350 and other references cited therein.) Examples of these organic halides and pheudo halides will be given hereinafter.

Reaction with epoxides

The alkylthiomethylmetal compounds of this invention will react with epoxy compounds having the formula

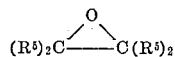

wherein each $R^5$ is either a hydrogen atom or a saturated or unsaturated alkyl, aryl, aralkyl, or alkaryl group containing 1 to 30 carbon atoms, 1 to 10 oxygen substituents replacing methylene groups in alkyl and alkylene groups and 0 to 5 substituent tertiary amino groups. The total number of carbon atoms in the epoxide compound should be less than 38 carbon atoms and should preferably be less than about 28 carbon atoms. The product of this reaction is a compound having the formula

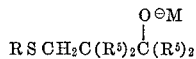

wherein R, $R^5$ and M have the definitions given hereinbefore. This compound will react with water to form the corresponding gamma hydroxyalkyl alkyl sulfide. The corresponding sulfoxide, prepared by oxidation, will react with conventional organic halides and pseudo halides (ether forming agents) having the formula $$R^6X^2$$

wherein $R^6$ is an alkyl, aryl aralkyl, or alkaryl group containing 1 to 30 carbon atoms, 1 to 10 oxygen substituents replacing methylene groups in alkyl and alkylene groups and 0 to 5 substituent tertiary amino groups, and wherein $X^2$ is a halogen atom, either chlorine, bromine or iodine or a pseudohalide such as alkylsulfate groups $R^6SO_4$ etc., to give the corresponding alkoxide having the formula

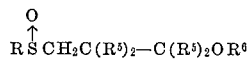

The above compound and the alkylation reaction are described in U.S. Pats. 3,288,858 and 3,288,859.

The epoxide compounds $R^5$ in the above formulas is preferably an alkyl group containing from 1 to 20 carbon atoms (e.g., methyl, ethyl, n-propyl, isopropyl, n-pentyl, isopentyl, n-hexyl, 2,2-dimethylpentyl, n-heptyl, n-octyl, 2,2-dimethylhexyl, isooctyl, 2-ethylhexyl, n-nonyl, n-decyl, tripropylene, undecyl, n-dodecyl, tetrapropylene, tridecyl, n-tetradecyl, pentadecyl, n-hexadecyl, n-octadecyl, eicosyl, cyclopentyl, cyclohexyl, cyclohexylmethyl, methylcyclohexyl, 2-cyclohexyldodecyl, 12-cyclohexyldodecyl, 4-dodecylcyclohexyl, and cyclooctyl groups). Preferably, three of the $R^5$ groups are hydrogen atoms. Terminal epoxy groups are more reactive, easier to obtain, and give cleaner reaction products.

Other suitable $R^5$ groups include phenyl, biphenyl and napthyl groups and substituted aryl groups such as tolyl, dodecylphenyl, 2-methyl-4-biphenyl, 4-methyl-1-naphthyl, 4-octyl-2-naphthyl, and 2,4-dimethylphenyl groups. Still other examples of suitable groups include aralykl groups such as 3-phenyldodecyl, 4-phenyloctyl, 4-phenyldecyl, 4-phenylbutyl, p-tolylmethyl, 3-(2-naphthyl)propyl, 4-(1-naphthyl)butyl, 3-biphenylpentyl and 3-biphenylpropyl groups. ("Aralkyl," as used herein, throughout the specification and claims, comprises "alkaralkyl.") Hydrocarbon groups are preferred.

Other substituted $R^5$ groups include: 4,7,10,13-tetraoxaeicosyl; 3-(p-tolyl)propyl; 4-phenylbutyl, 4-(1-naphthyl)butyl; 3-(ethylnaphthyl)propyl; 3-(4-biphenyl)propyl; 3-(dimethylamino)-propyl; 3,6-di(diethylamino)hexyl; and 3-dodecoxypropyl groups.

Conventional organic halides and pseudo halides $R^6$ is preferably an alkyl group, either saturated or unsaturated, containing from one to 20 carbon atoms. Examples of these groups are: methyl, ethyl, propyl, 2,4-hexadienyl, 2,4-dodecadienyl, 2,7-tetradecadienyl, 2,4,6-dodecatrienyl, allyl, 3-dodecenyl, 8-tetradecnyl, 2-dodecynyl, 2,4-hexadiynyl, 2,4-dodecadiynyl, isopropyl, butyl, 2-butenyl, hexyl, octyl, decyl, tetrapropylene, dodecyl, tridecyl, tetradecyl, pentadecyl, hexadecyl, octadecyl, eicosyl, and 2-octadecenyl groups.

$R^6$ can also be an aralkyl group (benzyl, 12-phenyldodecyl, 1-naphthylmethyl, 2-biphenyl-2-ethyl, etc.). Suitable substituted $R^6$ groups include 4-methoxybenzyl, 3,6,9,12-tetraoxaoctadecyl, and 3-diethylaminopropyl groups.

The hydroxy sulfides can be oxidized to the corresponding sulfoxides and/or sulfones or they can be reacted with an excess of the conventional organic halides and pseudo halides to give the corresponding sulfonium salts. Many of these compounds are known. As with the corresponding dialkyl sulfoxides, the hydroxyalkyl and alkoxyalkyl sulfoxides are detergents when they contain one long alkyl chain of from 8 to 20 carbon atoms and the sulfoxides and sulfones are fabric softeners for cotton when they contain two long alkyl chains. Hydroxy and alkoxy sulfoxides containing less than about 8 carbon atoms are excellent solvents for, e.g., glycerides. Sulfonium salts containing two long alkyl chains are substantive fabric softeners for cotton when applied from dilute solutions.

Reaction with aldehydes

The alkylthiomethylmetal compounds of this invention react readily with aldehydes having the formula $$R^7CHO$$

wherein $R^7$ is either a hydrogen atom or a saturated or unsaturated group which is either an alkyl, aryl, alkaryl or aralkyl group containing from one to about 30 carbon atoms, 1 to 10 oxygen atoms as substituents replacing methylene groups in alkyl and alkylene groups, and 0 to 5 substituent tertiary amino groups. The reaction proceeds as follows:

$$R^7CHO + RSCH_2^\ominus M^\oplus \longrightarrow RSCH_2\overset{O^\ominus M^\oplus}{\underset{|}{C}}HR^7$$

The resulting alkoxide salt can be reacted with water to give β-hydroxy sulfide compounds according to the following formula:

$$RSCH_2\overset{O^\ominus M^\oplus}{\underset{|}{C}}HR^7 + H_2O \longrightarrow RSCH_2\overset{OH}{\underset{|}{C}}HR^7 + MOH$$

The alkoxide salt can also be oxidized to the corresponding sulfoxide and then reacted with a conventional organic halide or pseudohalide as hereinbefore described according to the following equation:

$$R\overset{O}{\underset{\|}{S}}CH_2CH_2\overset{O^\ominus M^\oplus}{\underset{|}{C}}HR^7 + R^6X_2 \longrightarrow R\overset{O}{\underset{\|}{S}}CH_2CH_2\overset{OR_6}{\underset{|}{C}}HR^7 + MX^2$$

$R^7$ is preferably either a hydrogen atom or an alkyl group, either saturated or unsaturated, containing from one to 20 carbon atoms. Examples of these groups are: methyl, ethyl, propyl, 2,4-hexadienyl, 2,4-dodecadienyl, 2,7-tetradecadienyl, 2,4,6-dodecatrienyl, allyl, 3-dodecenyl, 8-tetradecenyl, 2-dodecynyl, 2,4-hexadiynyl, 2,4-dodecadiynyl, isopropyl, butyl, 2-butenyl, hexyl, octyl, decyl, tetrapropylene, dodecyl, tridecyl, tetradecyl, pentadecyl, hexadecyl, octadecyl, eicosyl, and 2-octadecenyl groups.

$R^7$ can also be an aryl group (e.g., phenyl, biphenyl, or naphthyl groups); an alkaryl group (4-decylphenyl, 2-methyl-1-naphthyl, o-tolyl, etc.); or an aralkyl group (benzyl, 12-phenyldodecyl, 1-naphthylmethyl, 2-(2-biphenyl)ethyl, etc.). These groups are also preferred. Suitable substituted $R^7$ groups include 2-methoxyphenyl, 3,6,9,12-tetraoxaoctadecyl, and 3-diethylaminopropyl groups.

The hydroxyalkyl sulfides which are known compounds, see, e.g., U.S. Pats. 2,515,120 and 3,247,258 can be oxidized to the corresponding sulfoxides and/or sulfones or they can be reacted with an excess of the organic halides and pseudo halides to give the corresponding sulfonium salts. Many of these compounds are known. As with the corresponding dialkyl sulfoxides, the hydroxyalkyl and alkoxyalkyl sulfoxides are detergents when they contain one long alkyl chain of from 8 to 20 carbon atoms (see, e.g., U.S. Pats. 3,236,879 and 3,290,254) and the sulfoxides and sulfones are fabric softeners for cotton when they contain two long alkyl chains.

Other utilities for β-hydroxy sulfides can be found in Organic Chemistry of Bivalent Sulfur (6 volumes); Reid, E. Emmet; Chemical Publishing Co. Inc., N. Y. especially volume II relating to Hydroxy and Halo Sulfides (1960) and more especially, pp. 210–211.

Hydroxy- and alkoxysulfoxides containing less than about 8 carbon atoms are excellent solvents for, e.g., glycerides. Sulfonium salts containing two long alkyl chains are substantive fabric softeners for cotton when applied from dilute solutions. Other 2-hydroxysulfonium salts are disclosed in Reid, op. cit. supra, p. 69.

Reaction with phosphites

The alkylthiomethylmetal compounds of this invention react with trialkyl or triaryl phosphites according to the following equation:

$$(R^8O)_3P + 3RSCH_2^\ominus M^\oplus \longrightarrow (RSCH_2)_3P + 3R^8OM$$

wherein each $R^8$ in the above equation is an alkyl, aryl, alkaryl or aralkyl hydrocarbon containing from 1 to 30 carbon atoms, there being no more than about 32 carbon atoms in the compounds $(R^8O)_3P$ and $(RSCH_2)_3P$. The resulting products $(RSCH_2)_3P$ are new compounds. When these compounds are oxidized sequentially as follows the resulting new compounds are chelating agents.

$$(RSCH_2)_3P + [O] \longrightarrow (RSCH_2)_3P \longrightarrow O$$

$$(RSH_2)_3P \longrightarrow O + 3[O] \longrightarrow (R\overset{O}{\underset{\uparrow}{S}}CH_2)_3P \longrightarrow O$$

$$(R\overset{O}{\underset{\uparrow}{S}}CH_2)_3P \longrightarrow O + 3[O] \longrightarrow (R\overset{O}{\underset{\uparrow}{S}}CH_2)_3P \longrightarrow O\\\downarrow\\O$$

The oxidation steps proceed sequentially. Mild oxidizing agents such as hydrogen peroxide can be used to oxidize the phosphines to the corresponding phosphine oxides and phosphine oxide-sulfoxides. The succeeding step in which the phosphine oxide-sulfoxide compounds are oxidized further to create the corresponding sulfones require much more stringent conditions, e.g., the use of strong oxidizing agents such as sodium or potassium hypochlorite.

The corresponding reaction wherein elemental sulfur replaces the oxygen in the initial reaction results in the corresponding phosphine sulfides as follows:

$$(RSCH_2)_3P + [S] \longrightarrow (RSCH_2)_3P \longrightarrow S$$

$$(RSCH_2)_3P \longrightarrow S + [O] \longrightarrow (R\overset{O}{\underset{\uparrow}{S}}CH_2)_3P \longrightarrow S$$

$R^8$ in the above formula for the phosphite reactant can be methyl, ethyl, 2,4-hexadienyl, 2,4-dodecadienyl, 2,7-tetradecadienyl, 2,4,6-dodecatrienyl, allyl, 3-dodecenyl, 8-tetradecenyl, 2-dodecynyl, 2,4-hexadiynyl, 2,4-dodecadiynyl, isopropyl, butyl, isobutyl, decyl, dodecyl, hexadecyl, eicosyl, phenyl, benzyl, 4-dodecylphenyl, etc. The preferred $R^8$ group is phenyl.

The sulfide-phosphine sulfide, sulfoxide-phosphine sulfide, sulfide-phosphine oxide, sulfoxide-phosphine oxide, and sulfone-phosphine oxide compounds are good metal chelating agents for heavy metal ions such as mercury, zinc, copper and nickel. These compounds are also effective additives for lubricants such as oils and greases to provide, e.g., good high temperature and pressure characteristics. These compounds also have herbicidal activity. Where one of the R groups in the compound is a long chain containing from 12 to about 24 carbon atoms and the other R groups are short chain groups the resulting phosphine oxide and phosphine oxide-sulfoxide compounds are excellent surface active agents useful for forming oil-in-water emulsions. The above compounds which contain two long alkyl chains are textile softeners for cotton when applied at a level of 1% by weight of the cloth in padding baths. Tris(methylthiomethyl)phosphine oxide kills oral bacteria, e.g., a streptococci.

The oxidation steps can be carried out in air at temperatures of from 0° C. to about 100° C. Water can be used as a solvent and is preferred.

Reaction with alkyl or aryl, halo and pseudo halo phosphines

The alkylthiomethylmetal compounds of this invention react readily with trihalophosphines, haloalkylphosphines, and haloarylphosphines according to the following equation:

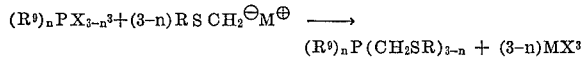

$$(R^9)_nP(CH_2SR)_{3-n} + (3-n)MX^3$$

wherein each $R^9$ in the above equation is an alkyl, aryl, aralkyl, or alkaryl group containing 1 to 30 carbon atoms, 1 to 10 oxygen atoms as substituents replacing methylene groups in alkyl and alkylene groups, and 0 to 5 substituent tertiary amino groups wherein $X^3$ is either a halogen atom, either chlorine, bromine, or iodine or a pseudo halogen group such as $R''O—$, $—NR_2''$ and $—SO_4R''$, wherein $R''$ is selected from the group consisting of alkyl, aryl, alkaryl and aralkyl groups containing from 1 to 30 carbon atoms, from 0 to 10 substituent oxygen atoms replacing methylene groups in alkyl and alkylene groups and from 0 to 5 substituent tertiary amino groups, and wherein $n$ is either 0, 1 or 2. These compounds will undergo several reactions. For example, the compounds can be oxidized step-wise as described hereinbefore to the following compounds.

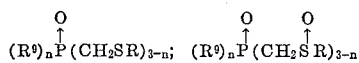

and

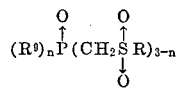

$R^9$ in the above formulas and equations is preferably either a phenyl group or an alkyl chain containing from 1 to 20 carbon atoms. Examples of these groups are: methyl, ethyl, propyl, 2,4-hexadienyl, 2,4-dodecadienyl, 2,7-tetradecadienyl, 2,4,6-dodecatrienyl, allyl, 3-dodecenyl, 8-tetradecenyl, 2-dodecynyl, 2,4-hexadiynyl, 2,4-dodecadiynyl, isopropyl, butyl, 2-butenyl, hexyl, octyl, decyl, tetrapropylene, dodecyl, tridecyl, tetradecyl, hexadecyl, octadecyl, eiscosyl, and 2-octadecenyl groups.

$R^9$ can be an aryl group (e.g., phenyl, biphenyl, or naphthyl groups); an alkaryl group (4-decylphenyl, 4-methyl-1-naphthyl, ethyldiphenyl, 2-methylphenyl, etc.); or an aralkyl group [benzyl, 12-phenyldodecyl, 1-naphthylmethyl, 2-(4-biphenyl)-ethyl, etc.] These groups are also preferred. Suitable substituted $R^9$ groups include 4-methoxyphenyl, 3,6,9,12 - tetraoxaoctadecyl, 3,6-di(dimethylamino)hexyl, and 3-diethylaminopropyl groups.

The preferred $X^3$ is chlorine.

The products of the reactions of alkylthiomethylmetal compounds with the phosphites and halophosphines and the oxidized and/or sulfurized analogs of said products have the generic formula:

$$PQ_y[—CH_2S(→O)_zR]_L(R^9)_{3-L}$$

wherein $y$ is 0 or 1, Q is (→O) or (→S), each $z$ is 0, 1 or 2, when Q is (→O), 0 or 1 when Q is (→S) and 0 when $y$ is 0, L is an integer from one to three, and R and $R^9$ have the definitions given hereinbefore.

The compounds which contain phosphine oxide moieties are surface active agents useful for forming oil in water emulsions when one of the R groups contains about 8 to about 24 carbon atoms and the other R groups are short alkyl groups. All of these compounds have herbicidal characteristics and are lubricant additives as discussed hereinbefore. When there are two long alkyl groups of from 12 to 24 carbon atoms in these compounds they are textile softeners for cotton when used at a level of about 1% by weight of the cloth and applied in a padding bath.

All of the above compounds which contain sulfide groups and phosphine groups can be converted to phosphonium compounds with a conventional organic halide or pseudo halide $R^6X^2$ as hereinbefore described according to the following equation:

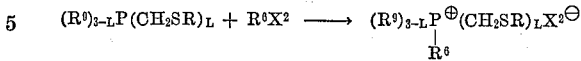

When these phosphonium compounds contain one long alkyl chain of from about 8 to 14 carbon atoms they are effective surface active agents. When the compounds contain two long alkyl chains of from 16 to about 24 carbon atoms these compounds are substantive textile softeners.

The phosphonium compounds can be reacted with, e.g., sodium hydroxide according to the disclosure in the copending application of Hays, Ser. No. 329,281, filed Dec. 9, 1963, to form the phosphine oxide compounds described hereinbefore which contain sulfide groups.

Reaction with halo or pseudo halo alkyl and aryl silanes

The alkylthiomethylmetal compounds of this invention react with halo or pseudo halo alkyl and aryl silanes according to the following equation:

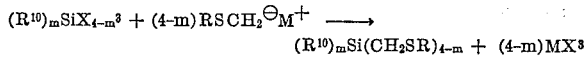

$$(R^{10})_mSi(CH_2SR)_{4-m} + (4-m)MX^3$$

wherein $R^{10}$ is an alkyl, aryl, alkaryl, or aralkyl group containing from 1 to 30 carbon atoms, from 0 to 10 oxygen atoms as substituent for methylene groups in alkyl chains, and from 0 to 5 substituent tertiary amino groups, wherein $X^3$ is a chlorine, bromine or iodine atom or a pseudo halide such as alkyl sulfate groups $R^{11}SO_4—$, an alkoxy group ($R^{11}O—$), or tertiary amino group $[R_2^{11}N—]$, and wherein $m$ is an integer from 1 to 3, The product of these reactions $(R^{10})_mSi(CH_2SR)_{4-m}$ are new compounds. These sulfied compounds can be converted to sulfonium salts with an organic halide or psuedo halide $R^6X^2$ as hereinbefore described. [The corresponding sulfonium compounds, e.g.,

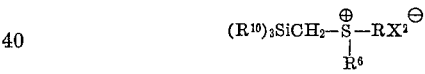

are old compounds. (N.E. Miller, Inorg. Chem., 4, 1458 (1965).]

Preferred $R^{10}$ groups are a phenyl group and alkyl groups containing from 1 to 20 carbon atoms, e.g., methyl, ethyl, propyl, 2,4-hexadienyl, 2,4-dodecadienyl, 2,7-tetradecadienyl, 2,4,6,-dodecatrienyl, allyl, 3-dodecenyl, 8-tetradecenyl, 2-dodecynyl, 2,4-hexadiynyl, 2,4-dodecadiynyl, butyl, octyl, decyl, dodecyl, tridecyl, tetradecyl, pentadecyl, octadecyl, 2-octadecenyl, and eicosyl groups.

$R^{10}$ can be aryl group (e.g. phenyl, biphenyl, or napthyl groups); and alkaryl group (4-decylphenyl, 4-methyl-1-naphthyl, ethyldiphenyl, 2-methylphenyl, etc.); or an aralkyl group (benzyl, 12-phenyloodecyl, 1-naphthylmethyl, 2-(4-biphenyl)-ethyl, etc.). These groups are also preferred. Suitable substituted $R^9$ groups include 4-methoxyphenyl, 3,6,9,12-tetraoxaoctadecyl, 3,6-di(dimethylamino)hexyl, and 3-diethylaminopropyl groups.

Reaction with carbon dioxide

The alkylthiomethylmetal compounds of this invention will react with carbon dioxide according to the following equation:

$$RSCH_2^{\ominus}M^{\oplus} + CO_2 \rightarrow RSCH_2COOM$$

The resulting compounds are salts of alkylthiloacetic acids. When R is an alkyl chain containing from about 8 to about 20 carbon atoms, these salts of alkylthioacetic acids are surfactants useful for emulsifying fats and oils and useful additives for motor fuels (see U.S. Pat. 2,600,113). The salts of alkylthioacetic acids can be oxidized to form the corresponding salts of alkyl sulfinyl acetic acids and/or the alkyl sulfonyl acetic acids. These sulfinyl and sulfonyl acetic acids are also surface active agents useful for emulsifying fats and oils when R is an alkyl chain containing from about 8 to 20 carbon atoms. The alkyl thioacetic acids can also be used as intermediates in the preparation of the compounds of U.S. Pat. 3,197,498.

Reaction with sulfur

The alkylthiomethylmetal compounds of this invention react with sulfur according to the following equation:

$$RSCH_2^\ominus M^\oplus + S \to RSCH_2SM$$

The products of this reaction, which are alkali metal alkylthiomethyl mercaptides, can be reacted with alkyl halides ($R^3X$) as described hereinbefore to give disulfide compounds having the formula $RSCH_2SR^3$. These disulfide compounds can be oxidized to give the corresponding disulfoxides, which are known surface active agents, when one of the R groups contains from about 8 to about 20 carbon atoms. The short chain disulfoxides can also be converted into surface active agents according to the teachings of U.S. Pat. 3,124,618.

All parts, percentages and ratios herein are by weight unless otherwise specified. The following examples are illustrative of the invention and should not be taken as limiting the scope of the claims.

EXAMPLE I

Preparation of methylthiomethyllithium 5.8 gm. (0.05 mole) of N,N,N',N'-tetramethylethylenediamine (TMEDA) was added to 36 ml. of 1.4 molar (0.05) n-butyllithium in hexane to form 0.05 mole of the n-butyllithium-TMEDA complex. (The temperature in these reactions was held below about 20° C. by means of a water bath.) 3.1 g. (0.05 mole) of dimethyl sulfide was added to the complex and after about a quarter of an hour a white precipitate had formed. This precipitate was composed of lithium methyl mercaptide and methylthiomethyllithium. After about four hours, the resulting reaction mixture containing the methylthiomethyllithium (MTML) was used in the following reaction. All reactions herein (Including Examples II–XVI) were carried out in an inert atmosphere of nitrogen.

When in the above example the following alkyl methyl sulfides are substituted on a molar basis for the dimethyl sulfide, substantially equivalent results are obtained in that the corresponding alkylthiomethyllithium compounds are prepared: methyl, ethyl, n-propyl, isopropyl, n-pentyl, isopentyl, n-hexyl, 2,2-dimethylpentyl, n-heptyl, n-octyl, 2,2-dimethylhexyl, isooctyl, 2-ethylhexyl, n-nonyl, n-decyl, tripropylene, undecyl, n-dodecyl, tetrapropylene, tridecyl, n-tetradecyl, pentadecyl, n-hexadecyl, n-octadecyl, eicosyl, cyclopentyl, cyclohexyl, cyclohexylmethyl, methylcyclohexyl, 2-cyclohexyldodecyl, 12-cyclohexyldodecyl, 4-dodecylcyclohexyl, cyclooctyl, phenyl, biphenyl, naphthyl, 3-phenyldodecyl, 4-methyldecyl, 4-phenyloctyl, 4-decyl, 4-phenylbutyl, 3-methyldecyl, 3-(1-naphthyl)propyl, 4-(1-naphthyl)butyl, 3-ethyl,3-(4-biphenyl)propyl, and 3-(4-biphenyl)propyl methyl sulfides.

When in the above example the following metalating agents are substituted on a molar basis for n-butyllithium-TMEDA complex substantially equivalent results are obtained in that the alkylthiomethylmetal compounds are prepared: phenyl-sodium; phenylpotassium; methyl, ethyl, propyl, butyl, pentyl, octyl, decyl, tetrapropylene, hexadecyl, dodecyl, octadecyl, and eicosyl sodiums and potassiums; the complexes of methyl, ethyl, propyl, butyl, pentyl, octyl, decyl, tetrapropylene, hexadecyl, dodecyl, octadecyl and eicosyl lithiums with N-methyl, N-ethyl, N'-propyl, N'-butylpropylenediamine, N-dodecyl, N,N',N'-trimethylmethylenediamine, N-octyl, N,N'-N'-triethylbutylenediamine, N,N',N'-tetraethylpropylenediamine, or N-eicosyl, N,N',N'-trimethylethylenediamine or t-butyllithium with diazabicyclo(2.2.2.)-octane.

When in the above example the following saturated hydrocarbons are substituted, either wholly or in part (e.g., 1:1 mixtures), for the hexane, substantially equivalent results are obtained in that the alkylthiomethylmetal compounds are prepared: pentane, octane, isooctane, nonane, decane, isododecane, and cyclohexane.

EXAMPLE II

Reaction of chlorodiphenylphosphine with methylthiomethyllithium 0.2 mole of the filtrate of Example I was added dropwise over a period of one hour to a solution of 44 g. (0.2 mole) of chlorodiphenylphosphine in 100 ml. of tetrahydrofuran. The mixture was stirred for an additional two hours and the reaction mixture was carefully hydrolyzed with 100 ml. of 2.5 molar ammonium chloride. The organic layer was dried, concentrated and distilled under reduced pressure to give 24.4 g. of (methylthiomethyl)diphenylphosphine, B.P. 160–165° C. (0.5 mm.). The product gave rise to a $P^{31}$ nmr signal at +21 p.p.m. in $CHCl_3$ and $H^1$ nmr signals centered at τ2.8 (aromatic), 7.08 (methylene, doublet, J=3 cps.), and 8.02 (methyl, singlet) in the correct area ratios.

When in the above example the following halo, halo alkyl or aryl phosphines are substituted on a molar basis for the chlorodiphenylphosphine, substantially equivalent results are obtained in that the corresponding (methylthiomethyl)alkyl or aryl phosphines are prepared: phosphorus trichloride, phenylmethylchlorophosphine, diallylbromophosphine, dimethylchlorophosphine, dodecylmethylchlorophosphine, dimethyliodophosphine, dodecyldichlorophosphine, hexadecyldibromophosphine, (2-octadecynyl)-1-naphthylchlorophosphine, 4-biphenylisopropylchlorophosphine, 3,6,9,12-tetraoxaoctadecylmethylbromophosphine, 4-methoxyphenyldichlorophosphine and (3-diethylaminopropyl)phenylchlorophosphine.

When in the above example any of the alkylthiomethyl alkali metals of Example I are substituted for the methylthiomethyllithium a molar basis, substantially equivalent results are obtained in that the corresponding (alkylthiomethyl)alkyl or aryl phosphines are prepared.

These products are all useful as lubricant additives, herbicides, and intermediates in the preparation of other compounds as described in detail both hereinbefore and hereinafter.

EXAMPLE III

Quaternization of (methylthiomethyl)diphenylphosphine

Treatment of 1.5 ml. of the (methylthiomethyl)diphenylphosphine with an excess of methyl iodide in 20 ml. of acetone gave 2.45 g. of diphenylmethyl(methylthiomethyl)phosphonium iodide, M.P. 161.5–163.5° C. The nmr analysis in $CDCl_3$ was: $H^1$ signals centered at τ2.18 (aromatic), 5.27 (methylene, doublet, J=8 cps.), 7.07 (≡$PCH_3$, doublet, J=13 cps.), and 7.71 (—$SCH_3$, singlet).

When in the above reaction any of the other phosphine reaction products of Example II are substituted on a molar basis for the (methylthiomethyl)diphenylphosphine, substantially equivalent results are obtained in that the corresponding phosphonium iodides are prepared.

When in the above reaction the following alkyl halides are substituted on a molar basis for the methyl iodide, substantially equivalent results are obtained in that the corresponding phosphonium salts are prepared: ethyl, allyl; isopropyl; tetrapropylene; dodecyl; 2-dodecynyl; 2,4-dodecadiynyl; 2,4-dodecadienyl; benzyl; 1-naphthylmethyl; (2-biphenyl)-2-ethyl; 4-methoxybenzyl; 3,6,9,12-tetraoxaoctyl; and 3-diethylaminopropyl chlorides, bromides, iodides and methyl sulfates.

EXAMPLE IV

Sulfurization of (methylthiomethyl)diphenylphosphine 0.05 mole of the filtrate of Example I was added dropwise to 15 g. (0.07 mole) of chlorodiphenylphosphine in 15 ml. of tetrahydrofuran, as in Example II. The reaction was quite exothermic. The mixture was then stirred for about one hour and 1.9 g. (0.06 mole) of sulfur was added in four parts over a one-half hour period. The mixture was stirred for another one-half hour and then added to a chilled solution of 0.2 mole of NH$_4$Cl in 150 ml. of water. The organic layer was separated and combined with an ether extract of the aqueous layer. The product, a viscous oil, was further purified by chromatography on alumina, and crystallization from benzene to give 6.98 g. of (methylthiomethyl)diphenylphosphine sulfide, M.P. 43–45° C. Gas chromatography showed that the compound was pure. The nmr analysis showed: aromatic protons centered at $\tau$ 2.4, methylene protons at $\tau$ 6.61 (doublet, J=8 cps.), and methyl protons at $\tau$ 7.95 (singlet) in the correction area ratios. Continued elution of the column with chloroform and methanol gave glassy materials.

When in the above example any of the phosphine reaction products of Example II are substituted on a molar basis for the (methylthiomethyl)diphenylphosphine the corresponding sulfides are prepared.

When in the above example the sulfide products are reacted with excess 30% aqueous hydrogen peroxide the corresponding sulfoxide-phosphine sulfides are formed, e.g., (methylsulfinylmethyl)diphenylphosphine sulfide.

All of the above products are herbicides, lubricant additives, surface active agents, and chelating agents for heavy metal ions as hereinbefore discussed.

EXAMPLE V

Reaction of methylthiomethyllithium with decylbromide

A mixture of MTML and lithium methyl mercaptide prepared by reacting 0.05 mole of dimethyl sulfide with 0.05 mole of n-butyllithium-TMEDA complex was added slowly to 12.2 g. (0.06 mole) of decylbromide dissolved in 50 ml. of tetrahydrofuran. The reaction was mildly exothermic. After the reaction mixture was stirred for about two hours at room temperature, the reaction mixture was washed successively with 100 ml. of 2 molar ammonium chloride and dilute sulfuric acid. The organic layer was dried over sodium sulfate and concentrated to give a mixture which was determined by gas-liquid phase chromatographic analysis to be decyl bromide, 1-decene, 1-undecene, decyl methyl sulfide and undecyl methyl sulfide. The approximate ratio of the decyl methyl sulfide to the undecyl methyl sulfide was 1:9. The undecyl methyl sulfide can be oxidized to the corresponding sulfoxide which is a detergent.

When in the above example any of the alkyl chlorides, bromides, or iodides of Example III are substituted on a molar basis for the decylbromide, substantially equivalent results are obtained in that the methylthiomethyllithium compound is alkylated.

EXAMPLE VI

Reaction of methylthiomethyllithium with benzaldehyde 0.05 mole of MTML as produced in Example I was added rapidly to 6.36 g. (0.06 mole) of benzaldehyde dissolved in 30 ml. of tetrahydrofuran which had been cooled with Dry Ice. The mixture was then allowed to warm to room temperature and stirred for one hour. Aqueous ammonium chloride was added, the resulting organic layer was separated and dried over sodium sulfate, and the product was concentrated and distilled under vacuum to give 7.1 g. of 2-phenyl-2-hydroxyethyl methyl sulfide, B.P. 100–102° C. (1 mm.). The literature gives a B.P. of 92–95° C. at 1 mm. The product was reacted with methyl iodide to give the known sulfonium iodide, M.P. 134–136° C.

When in the above example the following aldehydes are substituted on a molar basis for the benzaldehydes, substantially equivalent results are obtained in that the corresponding 2-hydroxy-alkylmethyl sulfides are prepared: formaldehyde, acetaldehyde, lauraldehyde, naphthaldehyde, 2-methoxybenzaldehyde, 3,6,9,12-tetraoxaoctadecaldehyde, 3-diethylaminopropaldehyde, 8-tetradecenaldehyde, 2-dodecynaldehyde and 2,4-dodecadiynaldehyde.

EXAMPLE VII

Reaction of MTML with chlorotrimethylsilane 0.1 mole of MTML as produced in Example I was added slowly to 10.8 g. (0.1 mole) of chlorotrimethylsilane in 20 ml. of tetrahydrofuran. The reaction was mildly exothermic. The reaction mixture was heated at reflux for 0.5 hr., cooled and hydrolyzed with 200 ml. of 2 molar ammonium chloride. Separation and purification by distillation gave 7.82 g. of methyl trimethylsilylmethyl sulfide, B.P. 135° C. A H$^1$ nmr analysis gave: three singlets centered at $\tau$ (relative to internal CHCl$_3$); 7.95 (—SCH$_3$); 8.35 ($\equiv$SiCH$_2$S—); and 9.97 [Si(CH$_3$)$_3$] in the correct area ratios. 5.7 g. (0.04 mole) of methyl iodide was added to 2.68 g. of methyl trimethylsilylmethyl sulfide in 20 ml. of acetone to give 4.95 g. of the known compound dimethyl trimethylsilylmethyl sulfonium iodide, M.P. 105–107° C.

When in the above example the following haloalkyl- or arylsilanes are substituted on a molar basis for the chlorotrimethylsilane substantially equivalent results are obtained in that the corresponding silyl compounds are prepared: bromobenzylethylallylsilane; chloroeicosylcyclohexyl(2,4 - hexadiynyl)silane; 4 - dimethylaminophenyl-[3 - (4 - biphenyl)propyl](3,6,9,12 - tetraoxaoctadecyl)-silane; chlorodiphenylsilane; dimethylphenylchlorosilane; dodecoxynaphthyl(3 - di - ethylaminopropyl) - (2,4 - dodecadiynyl)dichlorosilane and (diethylamino)tribromosilane.

EXAMPLE VIII

Reaction of MTML with butyraldehyde 0.2 mole of MTML prepared as in Example I was added dropwise to 15.9 g. (0.22 mole) of butyraldehyde in 100 ml. of tetrahydrofuran which had been cooled to −30° C. After the addition of the MTML the reaction mixture was stirred at −60° C. for 1 hr. and then allowed to warm to room temperature where it was stirred for 1 hr. The product was hydrolyzed with dilute aqueous ammonium chloride and the product was separated to give 13.7 g. of 2-hydroxypentyl methyl sulfide, B.P. 45–49° C. (0.5 mm.). An H$^1$ nmr analysis in CDCl$_3$ gave: signals centered at $\tau$6.3 (methine, unresolved complex multiplet); 7.42 (—SCH$_2$—, ABX pattern, J$_{AB}$=13.5 cps., J$_{AX}$=3.5 cps., J$_{BX}$=8.5 cps.), 7.9 (CH$_2$S— singlet); 8.52

(HOC—CH$_2$—CH$_2$— multiplet); and 9.04 (C—CH$_3$, triplet) in the correct area ratios. The OH proton was masked by the methylene protons centered at 7.42.

3.75 g. (0.026 mole) of methyl iodide was added to a solution of 1.76 g. (0.013 mole) of 2-hydroxypentyl methyl sulfide to give a quantitative yield of (2-hydroxypentyl)dimethylsulfonium iodide, M.P. 66–68° C.

EXAMPLE IX

Reaction of MTML with trimethylphosphite

Over a period of about a quarter of an hour 0.2 more of MTML as prepared in Example I was added to 6.2 g. (0.05 mole) of trimethylphosphite dissolved in 100 ml. of tetrahydrofuran. The reaction was mildly exothermic. The mixture was then heated at gentle reflux for one hour. The reaction mixture was then hydrolyzed with 200 ml. of 1.5 molar ammonium chloride and the organic layer was separated, dried over sodium sulfate, concentrated, and separated by gas phase chromatography to give tris-(methylthiomethyl)phosphine, B.P. 110° at 0.1 mm. Spectral analysis by H$^1$ nmr gave signals centered at $\tau$ 7.27 (methylene, doublet, J=4 cps.), and $\tau$ 7.80 (methyl, singlet) in the correct area ratios.

When in the above example the following alkyl and aryl phosphites are substituted on a molar basis for the trimethylphosphite substantially equivalent results are obtained in that the corresponding alkylthiomethylphosphines are prepared: ethylphenylallylphosphite; triethylphosphite; tributylphosphite; naphthyldodecyl(2,4-dodecadiynyl)phosphite; biphenylbenzylbutylphosphite; and triisopropylphosphite.

EXAMPLE X 0.3 mole of MTML as prepared in Example I was added to 31 g. (0.1 mole) of triphenylphosphite in 100 ml. of tetrahydrofuran over a period of about one-half of an hour. The reaction mixture was then heated at gentle reflux for two hours and then stirred overnight at room temperature. Purification of the reaction mixture gave 11.2 grams of tris(methylthiomethyl)phosphine, the same product prepared in Example IX.

EXAMPLE XI

Oxidation of tris(methylthiomethyl)phosphine 45 ml. (approximately 0.06 mole) of 30% hydrogen peroxide was added dropwise to a solution of 10.4 g. (0.049 mole) of tris(methylthiomethyl)phosphine dissolved in 30 ml. of acetone. A vigorous reaction resulted as evidenced by the evolution of heat. The oxidation of the phosphine compound was monitored by gas phase chromatography. After the reaction was completed the mixture was concentrated to give a solid contaminated with water. The water was removed by azeotroping with benzene. The dry residue melted over the range of 87–90° C. Two crystallizations from benzene/hexane solvent mixture gave 8.4 grams of a compound having a melting point of 90–92° C. The compound was tris(methylthiomethyl)phosphine oxide.

When the tris(methylthiomethyl)phosphine oxide is reacted with excess 30% aqueous hydrogen perioxide the product is tris(methylsulfinylmethyl)phosphine oxide.

When the tris(methylsulfinylmethyl)phosphine oxide is reacted with excess 4% aqueous sodium hypochlorite the product is tris(methylsulfonylmethyl)phosphine oxide.

When in the above example the corresponding (alkylthiomethyl)alkyl or aryl phosphines of Example II are substituted on a molar basis for the tris(methylthiomethyl)phosphine, substantially equivalent results are obtained in that the corresponding (alkylthiomethyl)alkyl or aryl phosphine oxides; (alkylsulfinylmethyl)alkyl or aryl phosphine oxides; and (alkylsulfonylmethyl)alkyl or aryl phosphine oxides are formed.

These products are all useful lubricant additives, chelating agents for heavy metal ions, herbicides, and surface active agents as hereinbefore described.

Example XII

Preparation of n-decylthiomethyllithium and reaction thereof with carbon dioxide 9.4 g. (0.05 mole) of n-decyl methyl sulfide was added to 0.05 mole of n-butyllithium/tetramethylethylenediamine complex as prepared in Example I at room temperature. A white precipitate formed during the four hour reaction time. Dry Ice ($CO_2$) was then added to the mixture and the acid fraction on concentration gave 1.96 g. of decylthioacetic acid, M.P. 51–53° C. An $H^1$ analysis gave signals centered at: $\tau$0.1 (acid); 6.76

(—$SCH_2CO_2$—)

7.34 (—$CH_2CH_2S$—, triplet, J=6 cps.), 8.7

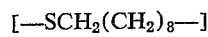
[—$SCH_2(CH_2)_8$—]

and 9.1 (—$CH_2CH_3$, triplet) in the correct area ratios.

2.63 gm. of 1-decene was also produced in this reaction.

EXAMPLE XIII

Reaction of MTML with sulfur 0.1 mole of MTML as prepared in Example I was added drop-wise to a dispersion of 2.9 g. (0.09 mole) of sulfur in 50 ml. of tetrahydrofuran. An exothermic reaction occurred and the mixture was stirred for about 45 minutes. The reaction mixture at this point contained lithium methylthiomethyl mercaptide ($CH_3SCH_2SLi$). 13.7 g. (0.1 mole) of butyl bromide was added drop-wise to this reaction mixture causing a slightly exothermic reaction. This mixture was then heated to a gentle reflux and was allowed to reflux for two hours. The reaction mixture was then cooled to room temperature and dropped into a solution of 0.3 mole (16.1 g.) of ammonium chloride in 150 ml. of water. The reaction mixture was extracted with ether and the extracts were distilled over sodium sulfate. The ether was then distilled at atmospheric pressure and the remaining liquid was transferred to a smaller flask where it was distilled using a water aspirator. Two fractions were taken and the remainder was distilled under 0.2 mm. pressure to give 3.4 g. of methylthiomethyl n-butyl sulfide, B.P. 34° C. (at 0.2 mm. of mercury). The hydrogen nmr spectra and elemental analysis confirmed the structure assignment.

EXAMPLE XIV

Reaction of methylthiomethyllithium with 1,2-epoxybutane 3.6 g. of 1,2-epoxybutane in 50 ml. of tetrahydrofuran was added to 0.5 mole of MTML as prepared in Example I at −60° C. The reaction mixture was held at −60° C. for one-half hour with stirring and then warmed to room temperature. The reaction product was then hydrolyzed with .6 mole of $NH_4Cl$ in 60 ml. of water, the resulting product extracted with ether, and the ether distilled to give 3.2 g. of 3-hydroxypentyl methyl sulfide, B.P. 105° at 18 mm. The 3-hydroxypentyl methyl sulfide can be oxidized to the corresponding sulfoxide which is a solvent for glycerides.

When in the above reaction, the following epoxides are substituted for the 1,2-epoxy butane, substantially equivalent results are obtained in that the corresponding 3-hydroxyalkyl methyl sulfides are obtained:

1,2 - epoxypropane; 1,2 - epoxy - 3 - ethyldecane; 1,2-epoxy-2-cyclohexylethane; styrene oxide; 1,2-epoxy-3-(2-methyl-4-biphenyl)pentane; 1,2-epoxy-2,2-dimethylethane; 1,2 - epoxy - 2 - (1-naphthyl-ethane; 1,2-epoxy-6,9,12,15-tetraoxadocosane; 1,2-epoxy-5-(dimethylamino)-propane; and 3,4-epoxyhexane. When these compounds contain from two to about six carbon atoms, the resulting products can be hydrolzed and oxidized to the corresponding sulfoxides which are solvents for glycerides. When the compounds contain more than six carbon atoms, the corresponding sulfoxides are surface active agents useful as, e.g., detergents.

EXAMPLE XV

When in the previous Examples II, IV, V, VI, VII, VIII, IX, X, and XIV the following solvents are substituted, either wholly or in part (e.g., 1:1 mixture), for the tetrahydrofuran, substantially equivalent results are obtained in that the reaction proceeds without interference: pentane; hexane; octane; isooctane; nonane; decane; isododecane; cyclohexane; diethyl ether; dibutyl ether; diphenyl ether; 1,2-dimethoxyethane; and diethylene glycol dimethyl ether.

EXAMPLE XVI

When in any of the previous Examples II, V, VI, VII, VIII, IX, X, XII, XIII, and XIV any of the alkylthiomethylmetal compounds of Example I are substituted for the methylthiomethyllithium or n-decylthiomethyl lithium compounds, substantially equivalent results are obtained in that analagous compounds are prepared.

EXAMPLE XVII

The detergent compounds of this invention can be used to formulate detergent compositions having the following formulas:

Spray-dried granular detergent

| | Percent |
|---|---|
| Detergent compounds of this application | 17.5 |
| Sodium sulfate | 23 |
| Sodium tripolyphosphate | 50 |
| Sodium silicate | 6 |
| Water | 3.5 |

Granular detergent

| | Percent |
|---|---|
| Detergent compounds of this application | 10 |
| Sodium dodecylbenzenesulfonate (the dodecyl group being derived from tetrapropylene) | 10 |
| Sodium nitrilo triacetate | 50 |
| Sodium sulfate | 30 |

Granular detergent

| | Percent |
|---|---|
| Detergent compounds of this application | 10 |
| Condensation product of one mole of nonyl phenol and nine moles of ethylene oxide | 10 |
| Sodium pyrophosphate | 50 |
| Sodium carbonate | 3 |
| Trisodium phosphate | 3 |
| Sodium sulfate | 24 |

Milled toilet bar

| | Percent |
|---|---|
| Detergent compounds of this application | 10 |
| Sodium coconut oil soap | 15 |
| Sodium tallow soap | 65 |
| Moisture | 10 |

Milled toilet bar

| | Percent |
|---|---|
| Detergent compounds of this application | 50 |
| Tallow fatty acid | 25 |
| Moisture | 15 |
| Cornstarch | 5 |
| Triethanolammonium ethylenediaminetetraacetate | 5 |

Scouring cleanser

| | Percent |
|---|---|
| Silica flour | 85 |
| Detergent consisting of 85% trisodium phosphate and 15% of the detergent compounds of this application | 15 |

Liquid detergent

| | Percent |
|---|---|
| Sodium dodecyl benzene sulfonate | 6 |
| Detergent compounds of this application | 6 |
| Potassium pyrophosphate | 20 |
| Potassium toluene sulfonate | 8 |
| Sodium silicate | 3.8 |
| Carboxymethyl hydroxyethyl cellulose | 0.3 |
| Water | Balance |

Liquid detergent

| | Percent |
|---|---|
| Detergent compounds of this application | 10 |
| Tetrasodium ethylenediaminetetraacetate | 25 |
| Water | 65 |

Examples of detergent compounds of this application include sodium, potassium, and ammonium decyl, dodecyl, and tetradecyl thioacetates; dodecylbis(methylthioethyl) phosphine oxide; octadecyl(ethylsulfinylmethyl)methylphosphine oxide; (tetradecylthiomethyl)dimethylphosphine oxide; and (octadecylsulfonylmethyl)diethylphosphine oxide. Other detergents disclosed herein and especially those of Examples III, IV and XI, can be substituted for the above examples to give substantially equivalent results in that the compositions have detergent properties. These detergent compositions are used according to the teachings of the prior art with respect to similar detergent compositions.

EXAMPLE XVIII

A 0.1% solution of tris(methylthiomethyl)phosphine oxide in water was used to kill the following oral bacteria: fusobacteria, streptococci, ceria, nisseria and nocardia. The solution had excellent bactericidal properties.

What is claimed is:

1. The process of preparing alkali metal alkyl thiomethyl mercaptides comprising the step of reacting alkylthiomethylmetal compounds having the formula $$RSCH_2M$$

wherein R is a saturated alkyl group containing from 1 to 30 carbon atoms, from 0 to 10 substituent oxygen atoms replacing methylene groups in alkyl and alkylene groups, from 0 to 2 substituents selected from the group consisting of aryl groups and alkaryl groups, said substituents being placed so that no aryl moiety or oxygen atom is attached to any carbon atom which is less than 3 atoms removed from the sulfur atom and wherein M is an alkali metal selected from the group consisting of lithium, sodium and potassium with elemental sulfur.

2. The process of claim 1 wherein R is an alkyl group containing from 8 to 20 carbon atoms.

References Cited

UNITED STATES PATENTS 3,336,391   8/1967   Lynes et al. _____ 260—607A

CHARLES B. PARKER, Primary Examiner

D. R. PHILLIPS, Assistant Examiner

U.S. Cl X.R.

X' Rd in parent application now U.S. 3,502,731